M. JOHNSON,

Assignor, by mesne assignments, to C. La Dow.

Plow.

No. 9,031. Reissued Jan. 6, 1880.

WITNESSES

Wm A. Skinkle

Geo W. Breck

Charles La Dow, ASSIGNEE OF

By his Attorneys Moses Johnson, INVENTOR:

Baldwin, Hopkins & Peyton

UNITED STATES PATENT OFFICE.

MOSES JOHNSON, OF LOCKPORT, NEW YORK, ASSIGNOR, BY MESNE ASSIGNMENTS, TO CHARLES LA DOW.

PLOW.

SPECIFICATION forming part of Reissued Letters Patent No. 9,031, dated January 6, 1880.

Original No. 85,451, dated December 29, 1868. Application for Reissue filed November 11, 1879.

DIVISION A.

*To all whom it may concern:*

Be it known that I, MOSES JOHNSON, formerly of Three Rivers, in the county of St. Joseph and State of Michigan, but now residing at Lockport, in the county of Niagara and State of New York, have invented certain new and useful Improvements in Plows, of which I hereby declare the following to be a full, clear, and exact description, reference being had to the accompanying drawings, making a part of this specification, in which drawings—

Figure 3:
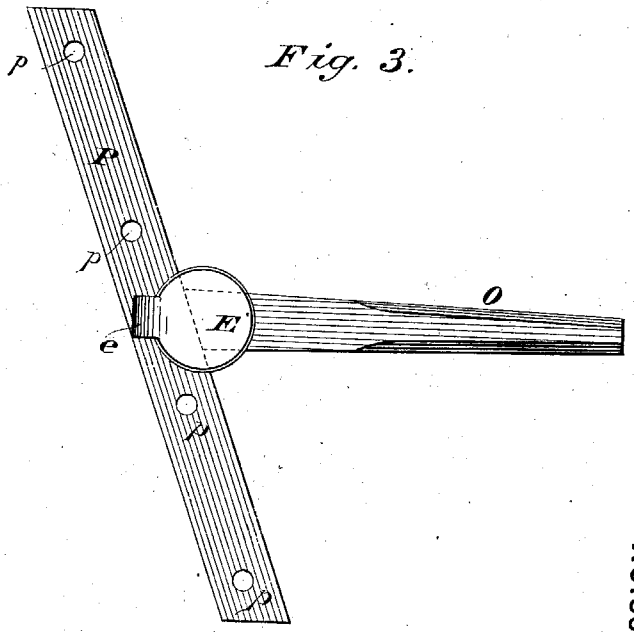
Figure 5:
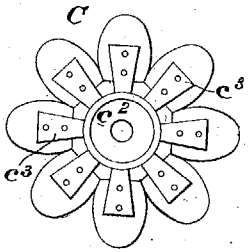
Figure 4:
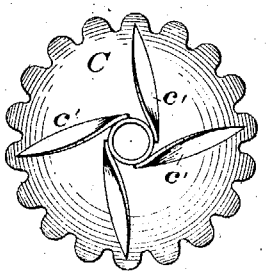
Figure 1:
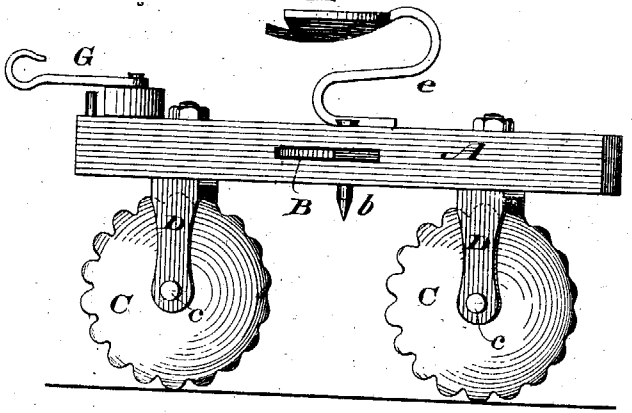
Figure 2:
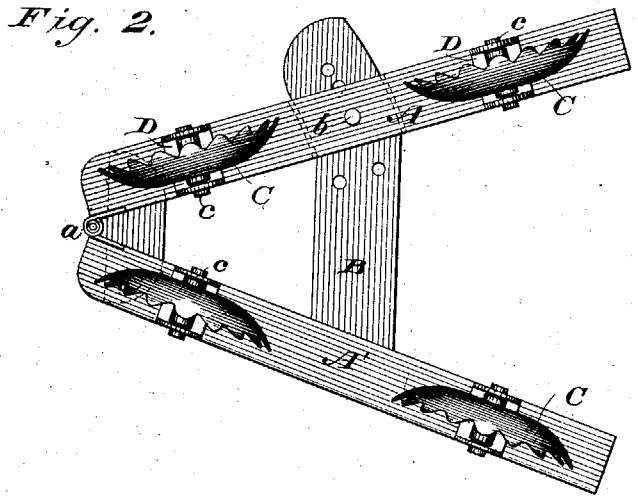

Figure 1 represents a side elevation of a machine embracing the improvements herein claimed; Fig. 2, an inverted plan view thereof; Fig. 3, a modification thereof. Figs. 4 and 5 represent views of the concave side of the wheels, showing different modifications thereof.

My invention relates to that class of plows or earth-turning machines commonly known as "wheel-harrows" or "disk-cultivators," in which rotating wheels or disk-cutters are employed for turning sidewise or inverting the furrows, or pulverizing the soil.

Prior to the date of my invention machines of this class were made with revolving cutters, either arranged in series or gangs, which were not adjustable relatively to the line of draft, or else so arranged as to be independently adjustable relatively thereto, but mounted on gang-bars or supporting-frames incapable of such adjustment.

Generally speaking, the object of my invention is to obviate the objections incident to this class of machines as heretofore constructed, and to secure an effective working instrument.

The first part of my invention relates to the method of connecting the wheel-gangs together; and its object is to enable the angle of each gang relatively to the line of draft readily to be varied, which end I attain by uniting the wheel-gangs by a hinge-connection.

The object of the next part of my invention is so to apply the draft as not to interfere with the adjustments of the wheel-gangs relatively to the line of draft, which end I attain by uniting the wheel-gangs by a hinge-connection at or near the draft-connection.

The object of the next part of my invention is to adjust and hold the wheel-gangs in the desired relation to each other and to the line of draft, which end I attain by uniting the wheel-gangs by a hinge-connection and connecting them by suitable adjusting mechanism.

The object of the next part of my invention is to enable the operator not only to adjust the gang-bars relatively to the line of draft, but to adjust each wheel independently relatively to the same line, which ends I attain by mounting the wheels on their respective laterally-adjustable gang-bars by adjusting mechanism which permits the angle of the disks to be varied relatively to the gang-bar or to the line of draft.

Figs. 1 and 2 of the drawings show a wheel-harrow, the frame of which consists of two side beams or gang-bars, A A′, united at their inner ends by a hinge, *a*, which permits their relation to each other and to the line of draft to be varied. A punctured arm or cross-brace, B, connects these beams securely together. This cross-brace passes through a slot in one of the beams, and the parts are securely fastened together in any desired position by means of a pin, *b*, passing through a hole in the side beam and through one of a series of holes in the cross-brace. By this means I am not only enabled to regulate the distance between the wheels of each gang, but to gage the depth and width of the furrow to be plowed. For instance, to plow a deep furrow, I adjust the beam to a sharp angle, the rule being, the sharper the angle the deeper the furrow, and vice versa.

The wheels C are represented as of concavo-convex shape, with their peripheries indented or corrugated, these corrugations being made sharp to enable them to penetrate the ground with greater ease. I prefer to connect these wheels with their respective gang-beams by mounting them on axles *c* in stirrups D, between the branches of which they revolve, the upper end of the stirrup terminating in a pivot-bolt passing through the beam and secured by a nut, thus constituting an adjusting-clamp of well-known construction, by means of which the wheels are not only firmly connected with the beams, but their angle of adjustment relatively to the beam or the line of draft can be varied without moving the beam.

The wheels may also be attached to the beams by various other well-known means. The wheel shown in Fig. 4, for example, is so constructed as to adapt it to revolve loosely around a stationary axle, instead of being attached to an axle revolving in bearings in the stirrup.

When my device is to be used for cultivating corn, potatoes, and the like, it is sometimes desirable to adjust the wheels on both beams so that the convex sides of the wheels shall all stand one way, by which means the furrow will be turned one way only, either to the right or left, as the operator may desire.

The fact that these wheels perform their office by a revolving motion, instead of the straight shoveling process of the common plow, secures for my plow a great saving of motive power, as is well understood.

The form of wheel shown in Fig. 4 is substantially the one I design for ordinary use. It is shown as provided with wings $c'$, tangential to the axle, which, when in use, aid in segregating and loosening the soil.

Fig. 5 shows a method by which I sometimes construct the corrugated wheel, which is therein represented as composed of a hub, $c^2$, resembling the common hub for wagon-wheels, and is also provided with arms $c^3$, to which corrugated concavo-convex flanges are firmly attached. This form of wheel is light and strong, and enables worn-out or broken flanges to be readily removed or replaced.

A driver's seat, E, is shown as supported by a standard, $e$, mounted on the cross-brace B of the frame.

In Figs. 1 and 2 the draft-connection is shown as consisting of a hook, G, to which the motive power is applied, said hook being attached at a point at or near the central line or hinge-connection of the gang-beams.

Fig. 3 represents my device in a form specially applicable to field-plowing. It consists of a tongue, O, to which a transverse cross-bar, P, is attached at an angle of about fifty degrees with the tongue, in order to place the concavo-convex wheels in the proper line with the draft. I usually place twelve such wheels on this beam P, and I find a team of good horses abundantly sufficient for its use, even in greensward. The letters $p\,p$ on the cross-beam show the points at which the wheels are attached.

For greensward or rooty soil it is desirable to place revolving cutters on the beam P, in front of the wheels.

The organization of instrumentalities shown in Fig. 3 is not, however, claimed herein, as such organization forms the subject-matter claimed in another division of this application.

Having thus described my improvement in plows, I claim as of my invention—

1. Wheel-gangs hinged together at their inner ends, so as to admit of their horizontal movement, substantially as hereinbefore set forth.

2. The combination, substantially as hereinbefore set forth, of wheel-gangs, their hinge which admits of their horizontal movement, and the draft-connection at or near the hinge.

3. The combination, substantially as hereinbefore set forth, of wheel-gangs, an interposed hinge-connection, and mechanism, substantially as described, whereby the angle of the gangs relatively to each other may be varied.

4. The combination, substantially as hereinbefore set forth, of disk-gangs, a hinge-connection, a cross-brace, and mechanism, substantially as described, for adjusting the gangs and holding them at regulated distances apart.

5. The combination, substantially as hereinbefore set forth, of gang beams, mechanism, substantially such as described, for adjusting their relation to the line of draft, the concavo-convex wheels or disk-cutters, and the adjusting-clamp by which their angle relatively to the line of draft is adjusted.

In witness that I claim the foregoing as my own I have hereunto set my hand and affixed my seal in the presence of two witnesses.

MOSES JOHNSON. [L. S.]

Witnesses:
C. M. SOUTHWORTH,
ALFRED H. ROWELL.